(12) United States Patent
Pikovsky et al.

(10) Patent No.: US 11,326,472 B2
(45) Date of Patent: May 10, 2022

(54) TURBINE ENGINE COMPRISING MEANS FOR AXIALLY HOMOGENISING THE TEMPERATURE OF AN INNER RING OF A ROLLER BEARING

(71) Applicant: SAFRAN AIRCRAFT ENGINES, Paris (FR)

(72) Inventors: Catherine Pikovsky, Moissy-Cramayel (FR); Thomas Gabriel Elie Gatteau, Moissy-Cramayel (FR); Aude Simonet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/665,037

(22) Filed: Oct. 28, 2019

(65) Prior Publication Data

US 2020/0131934 A1 Apr. 30, 2020

(30) Foreign Application Priority Data

Oct. 29, 2018 (FR) ...................................... 1860015

(51) Int. Cl.
*F01D 25/16* (2006.01)
*F01D 25/18* (2006.01)

(52) U.S. Cl.
CPC ............. *F01D 25/16* (2013.01); *F01D 25/18* (2013.01); *F05D 2220/32* (2013.01); *F05D 2240/54* (2013.01)

(58) Field of Classification Search
CPC ...... F01D 25/16; F01D 25/18; F05D 2240/54; F05D 2220/32
See application file for complete search history.

(56) References Cited

U.S. PATENT DOCUMENTS 2,911,267 A 11/1959 Small, Jr.
4,283,096 A * 8/1981 Picard .................. F01D 25/164
384/557

(Continued)

FOREIGN PATENT DOCUMENTS

CA 2442949 A1 4/2004
EP 0335779 A1 10/1989

(Continued)

OTHER PUBLICATIONS

Preliminary Search Report issued in French Patent Application No. 1860015 dated Jun. 13, 2019.

(Continued)

*Primary Examiner* — Shafiq Mian
(74) *Attorney, Agent, or Firm* — Pearne & Gordon LLP

(57) ABSTRACT

A turbine engine comprises a rotor shaft and a roller bearing supporting the shaft in rotation along an axis. The bearing comprises an inner ring, an outer ring, and rolling elements engaged between the inner and outer rings. The inner ring has a first axial end annular portion that is more exposed to heat during operation than a second axial end annular portion thereof. The turbine engine further comprises an oil injection device configured to supply the rolling elements with oil for lubrication of the latter. In order to homogenise the temperature of the inner ring, the latter comprises through-holes formed in the first axial end annular portion and distributed around the axis in order to allow for a circulation of oil coming from the oil injection device through the first axial end annular portion, thereby providing additional cooling to the first end annular portion.

14 Claims, 4 Drawing Sheets

(56) References Cited

U.S. PATENT DOCUMENTS

| | | | | |
|---|---|---|---|---|
| 4,884,903 | A * | 12/1989 | Pham | F16C 25/08 384/563 |
| 5,749,660 | A * | 5/1998 | Dusserre-Telmon | F16C 19/166 384/475 |
| 10,012,110 | B2 | 7/2018 | Pikovsky et al. | |
| 2003/0127927 | A1 * | 7/2003 | Razzell | H02K 7/11 310/90.5 |
| 2004/0062460 | A1 * | 4/2004 | Dusserre-Telmon | F01D 25/18 384/475 |
| 2013/0127179 | A1 * | 5/2013 | Takahashi | F01K 13/00 290/1 R |
| 2014/0321996 | A1 * | 10/2014 | Antunes | F16C 19/26 415/175 |
| 2015/0275760 | A1 * | 10/2015 | Kimura | F01D 25/18 60/39.08 |
| 2016/0115817 | A1 * | 4/2016 | Curlier | F01D 25/162 415/111 |

FOREIGN PATENT DOCUMENTS

| | | |
|---|---|---|
| EP | 2891810 A1 | 7/2015 |
| FR | 2949246 A1 | 2/2011 |
| JP | 2010216651 A | 9/2010 |

OTHER PUBLICATIONS

Application document as-filed for patent application entitled: Double Flow Turbojet Including an Intermediate Flow Path Dedicated to Supplying With Air via Radial Arms an Exhaust Casing of This Turbojet, U.S. Appl. No. 16/483,526, filed Aug. 5, 2019.

* cited by examiner

TURBINE ENGINE COMPRISING MEANS FOR AXIALLY HOMOGENISING THE TEMPERATURE OF AN INNER RING OF A ROLLER BEARING

This application claims priority from French Patent Application 1860015 filed Oct. 29, 2018, the entire content of which is incorporated by reference herein.

TECHNICAL FIELD

The present invention relates to the field of turbine engines, in particular for aircraft, and relates more particularly to the question of cooling a bearing in such a turbine engine.

PRIOR ART

The rotor shaft or shafts in turbine engines are supported and guided in rotation by bearings, which are in general roller bearings lubricated by means of a circulation of oil.

The thermal environment of such a bearing within a turbine engine determines the thermal behaviour of the bearing, and in particular determines the internal clearances of the bearing that must be provided when dimensioning the bearing so as to allow for the thermal expansions of the various constituents thereof during operation.

As these internal clearances have an influence on the overall dynamics of the turbine engine, it is desirable to minimise these internal clearances.

In this respect, it is notable that during operation, due to the high temperature of the primary flow in particular downstream from the combustion chamber, certain elements of such a turbine engine are hotter than others. This can result in an axial dissymmetry of the exposure to heat of such a bearing, in particular of the inner ring of the bearing, with such a dissymmetry having for consequence the existence of an axial thermal gradient within the inner ring.

The dimensioning of the internal clearances of such a bearing is therefore generally determined with respect to the hottest axial annular portion of the inner ring during operation, which amounts to over-dimensioning the internal clearances of the bearing in comparison with a bearing that would not be confronted with such a thermal dissymmetry.

DISCLOSURE OF THE INVENTION

The invention in particular has for purpose to provide a simple, economical and effective solution to this problem.

It proposes for this purpose a turbine engine, comprising a rotor shaft and at least one roller bearing supporting the rotor shaft in rotation along an axis, the bearing comprising an inner ring connected to the rotor shaft, an outer ring connected to an annular support belonging to a stator of the turbine engine, and rolling elements engaged between the inner ring and the outer ring, the inner ring having two axial end annular portions arranged axially on either side of the rolling elements, a first of the two axial end annular portions being exposed more to the heat during operation than a second of the two axial end annular portions, the turbine engine further comprising an oil injection device configured to supply the rolling elements with oil in such a way as to ensure the lubrication of the latter.

According to the invention, the inner ring comprises through-holes that connect a radially external surface of the inner ring to a radially internal surface of the inner ring, the through-holes being formed in the first axial end annular portion and distributed around the axis in order to allow for a circulation of oil coming from the oil injection device through the first axial end annular portion.

The through holes are configured for the circulation of oil therethrough to provide additional cooling to the first end annular portion, which is more exposed to the heat, in comparison with the second end annular portion, which is less exposed to the heat.

In particular, the through holes are thus configured to provide differential thermal cooling to the two axial end annular portions with respect to each other.

The invention thus makes it possible to improve the thermal homogeneity, in the axial direction, of the inner ring.

This results in a possibility of reducing the dimensioning of the internal clearances of the roller bearing, in comparison with the roller bearings of turbine engines of a known type.

In preferred embodiments of the invention, the turbine engine can have one or several of the following characteristics, taken individually or according to any technically permissible combinations:

the second axial end annular portion is devoid of through holes;

the through-holes extend radially;

the radially internal surface of the inner ring is in surface contact with a radially external surface of the rotor shaft at least on the first axial end annular portion, and the rotor shaft comprises channels that connect the radially external surface of the rotor shaft to a radially internal surface of the rotor shaft in such a way that the channels respectively extend the through-holes;

the channels extend radially;

the oil injection device comprises a first nozzle oriented in the direction of the rolling elements and a second nozzle oriented in the direction of respective radially external ends of the through-holes arranged in the radially external surface of the inner ring, the first nozzle and the second nozzle being arranged outside the rotor shaft;

an oil spray from the second nozzle reaches the respective radially external ends of the through-holes without encountering any obstacle;

the oil injection device comprises a first nozzle arranged outside the rotor shaft and oriented in the direction of the rolling elements, and a second nozzle arranged inside the rotor shaft and oriented in the direction of respective radially internal ends of the channels of the rotor shaft arranged in the radially internal surface of the rotor shaft;

an oil spray from the second nozzle reaches the respective radially internal ends of the channels of the rotor shaft without encountering any obstacle;

the inner ring comprises other through-holes that connect the radially external surface of the inner ring to the radially internal surface of the inner ring and opening radially facing the rolling elements, and the rotor shaft comprises other channels that connect the radially external surface of the rotor shaft to the radially internal surface of the rotor shaft in such a way that the other channels respectively extend the other through-holes; and the oil injection device comprises a first nozzle oriented in the direction of respective radially internal ends of the other channels of the rotor shaft arranged in the radially internal surface of the rotor shaft, and a second nozzle oriented in the direction of respective radially internal ends of the channels of the rotor shaft arranged in the radially internal surface of the rotor shaft, the first nozzle and the second nozzle being arranged inside the rotor shaft;

an oil spray from the second nozzle reaches the respective radially internal ends of the channels of the rotor shaft without encountering any obstacle;

the inner ring comprises passages that open into the radially external surface of the inner ring, facing the rolling elements, and connected to the through-holes or connected to the channels; and the oil injection device comprises a nozzle arranged inside the rotor shaft and oriented in the direction of respective radially internal ends of the channels of the rotor shaft arranged in the radially internal surface of the rotor shaft;

an oil spray from the nozzle reaches the respective radially internal ends of the channels of the rotor shaft without encountering any obstacle;

the turbine engine further comprises a combustion chamber, and the first axial end annular portion of the inner ring is axially arranged on the side of the combustion chamber;

the combustion chamber is arranged upstream from the roller bearing, and the first axial end annular portion of the inner ring is arranged upstream from the rolling elements.

BRIEF DESCRIPTION OF THE DRAWINGS

The invention shall be better understood, and other details, advantages and characteristics of the latter shall appear when reading the following description given by way of a non-limiting example and in reference to the accompanying drawings wherein.

In all of these figures, identical references can designate identical or similar elements.

DETAILED DISCLOSURE OF PREFERRED EMBODIMENTS

Figure 1:
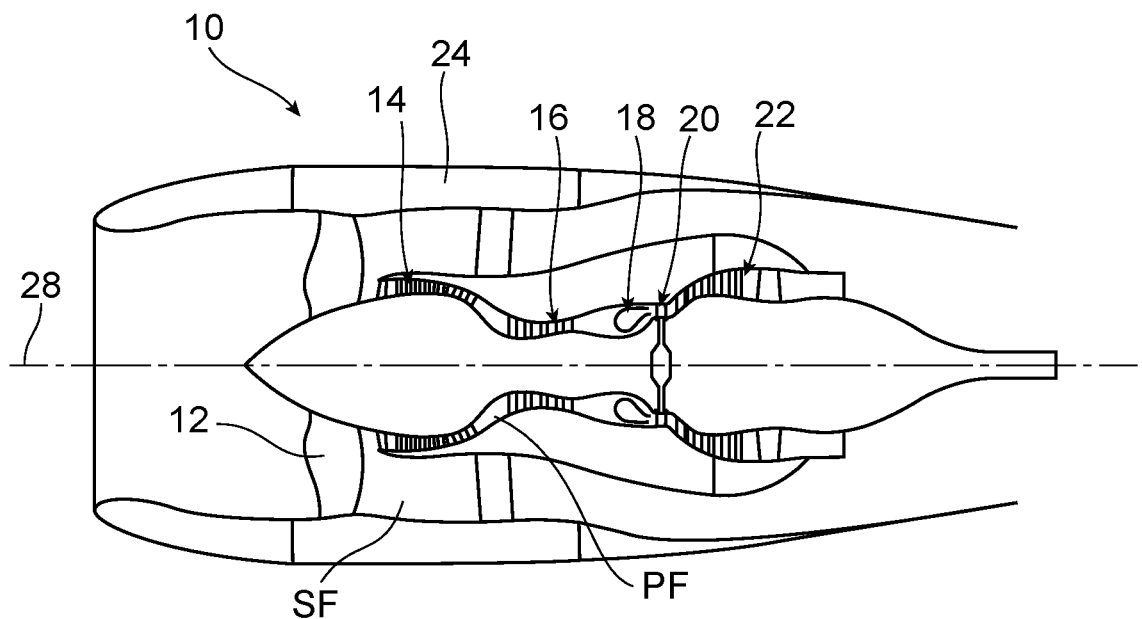
FIG. 1 is a diagrammatical view as an axial section of a turbine engine for an aircraft.

FIG. 1 shows a turbine engine 10 for an aircraft, generally comprising a fan 12 configured for the aspiration of a flow of air being divided downstream from the fan into a primary flow circulating in a primary flow channel, hereinafter referred to as primary duct PF, within a core of the turbine engine, and a secondary flow bypassing this core in a secondary flow channel, hereinafter referred to as secondary duct SF.

The turbine engine is for example of the bypass and two-spool type. The core of the turbine engine thus comprises, generally, a low-pressure compressor 14, a high-pressure compressor 16, a combustion chamber 18, a high-pressure turbine 20 and a low-pressure turbine 22.

The respective rotors of the high-pressure compressor and of the high-pressure turbine are connected by a rotor shaft referred to as "high-pressure shaft", while the respective rotors of the low-pressure compressor and of the low-pressure turbine are connected by a rotor shaft referred to as "low-pressure shaft".

The turbine engine is cowled by a nacelle 24 surrounding the secondary duct SF. Moreover, the rotors of the turbine engine are rotatably mounted around a longitudinal axis 28 of the turbine engine.

Throughout this description, the axial direction X is the direction of the longitudinal axis 28. The radial direction R is at all points a direction orthogonal to the longitudinal axis 28 and passing through the latter, and the circumferential direction C is at all points a direction orthogonal to the radial direction R and to the longitudinal axis 28. The terms "internal" and "external" respectively refer to a relative proximity, and a relative separation, of an element in relation to the longitudinal axis 28. Finally, the directions "upstream" and "downstream" are defined by reference to the general direction of the flow of gases in the primary PF and secondary SF ducts of the turbine engine, according to the axial direction X.

Each one of the rotor shafts is supported in rotation by several roller bearings, generally one or several ball bearings and one or several roller bearings, with each bearing being lubricated, during operation, by means of a circulation of oil.

Figure 2:
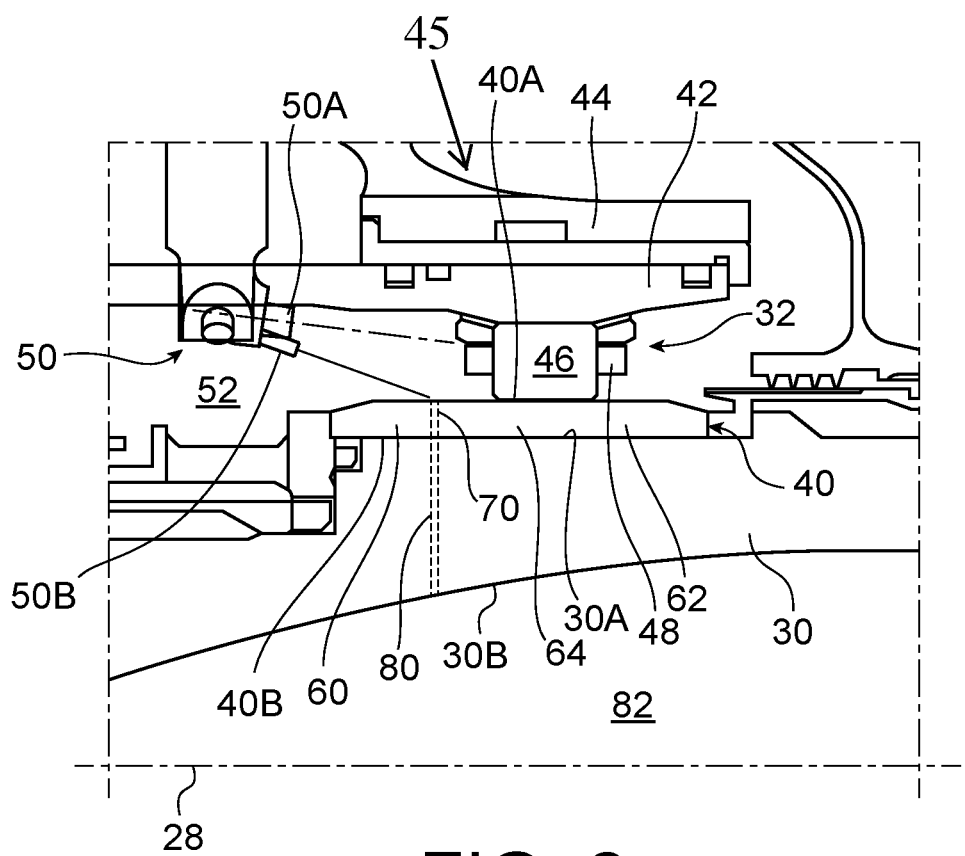
FIG. 2 is a diagrammatical half-view as an axial section on a larger scale of a portion of the turbine engine.

FIG. 2 thus shows a rotor shaft 30 and a roller bearing 32 participating in the support of the rotor shaft 30 in rotation along the longitudinal axis 28. In the example shown, the bearing 32 is axially arranged downstream from the combustion chamber 18, at the level of one of the turbines 20 and 22 (FIG. 1).

The rotor shaft 30 is a hollow shaft, and thus has a radially external surface 30A and a radially internal surface 30B (FIG. 2).

The bearing 32 comprises an inner ring 40 connected to the rotor shaft 30, an outer ring 42 connected to an annular support 44 belonging to a stator 45 of the turbine engine, and rolling elements 46 engaged between the inner ring 40 and the outer ring 42. These rolling elements 46 are typically balls or rollers. A cage 48 maintains the space between the rolling elements 46 constant.

The inner ring 40 has in particular a radially external surface 40A and a radially internal surface 40B.

The turbine engine further comprises an oil injection device 50 configured to supply the rolling elements 46 with oil in such a way as to ensure the lubrication of the latter. To this end, the roller bearing 32 is housed in an oil enclosure 52. Such an enclosure has for purpose to circumscribe the oil in a portion of the turbine engine around the bearing. To this end, the enclosure is delimited by the rotor shaft 30, the stator 45, and dynamic seals (of which one, referenced as 54, can be seen in FIG. 2). The dynamic seals provide the seal between the stator 45 and the rotor shaft 30, and respectively allow streams of air to enter the enclosure in such a way as to maintain the latter in positive pressure.

The inner ring 40 has in particular two axial end annular portions 60 and 62 arranged axially on either side of the rolling elements 46. It must be understood by this that the two axial end annular portions 60 and 62 are arranged axially on either side of a median annular portion 64 of the inner ring 40, on which the rolling elements 46 rest.

During operation, due to the high temperature of the primary flow PF, certain elements of the turbine engine are hotter than others. This can result in an axial dissymmetry of the exposure to heat of the inner ring 40.

Consequently, in such a bearing, a first 60 of the two axial end annular portions is more exposed to heat during operation than a second 62 of the two axial end annular portions.

This is in particular true regarding the bearings located downstream from the combustion chamber 18, such as the bearing 32 of FIG. 2, due to the fact that these bearings are exposed (at least indirectly) to the heat released by the gases coming from the combustion chamber 18.

In the case of a roller bearing arranged downstream from the combustion chamber 18 such as the bearing 32, the first axial end annular portion 60 is the portion located on the upstream side of the inner ring 40, upstream of the rolling elements 46.

Moreover, the dissymmetry of the exposure to the heat of the inner ring can be particularly marked with regards to the bearings located in the vicinity of a limit of their oil enclosure, due to the fact that the side of such a bearing facing the limit of the enclosure is more exposed to the heat of the air stream entering in the enclosure than the opposite side of the bearing.

Generally, in order to prevent the appearance, during operation, of an axial thermal gradient within the inner ring 40 of a bearing, the inner ring comprises, according to the invention, through-holes 70 that connect the radially external surface 40A to the radially internal surface 40B of the inner ring. These through-holes 70 are formed in the first axial end annular portion 60, and are distributed around the axis 28 in order to allow for a circulation of oil coming from the oil injection device 50 through the first axial end annular portion 60. The through-holes 70 are configured for such circulation of oil to provide additional cooling to the first end annular portion in comparison with the second end annular portion.

In this respect, the second axial end annular portion 62 is advantageously devoid of through holes such that no oil can circulate through the second axial end annular portion 62.

Alternatively, the second axial end annular portion 62 may comprise through holes allowing an oil circulation therethrough, in which case the through-holes 70 in the first axial end annular portion 60 are configured such that a flowrate of oil through the first axial end annular portion 60 is higher than a flowrate of oil through the second axial end annular portion 62.

In the examples shown, wherein the radially internal surface 40B of the inner ring 40 is in surface contact with the radially external surface 30A of the rotor shaft 30, the latter further comprises channels 80 that connect the radially external surface 30A to the radially internal surface 30B of the rotor shaft, in such a way that the channels 80 respectively extend the through-holes 70.

Figure 2A:
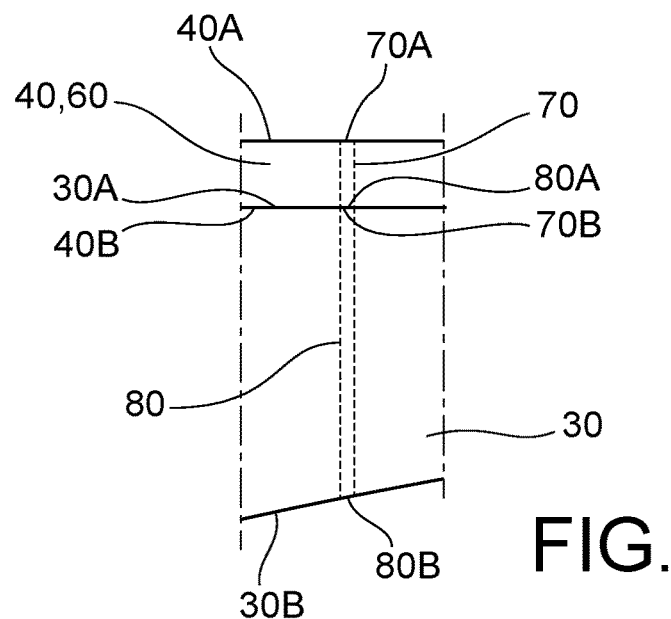
FIG. 2A is a view on a larger scale of a portion of FIG. 2.

It must be understood by this that a respective radially internal end 70B (arranged in the radially internal surface 40B of the inner ring) of each through-hole 70 opens into a respective radially external end 80A (arranged in the radially external surface 30A of the rotor shaft) of a corresponding channel 80, and that the channels 80 have respective radially internal ends 80B (arranged in the radially internal surface 30B of the rotor shaft) opening into an inner cavity 82 of the rotor shaft 30 (FIG. 2A).

The channels 80 therefore allow the oil coming from through-holes 70 to escape into the inner cavity 82 of the rotor shaft 30.

In the embodiments shown, the through-holes 70 and the channels 80 extend radially.

Alternatively, the through-holes 70, and where applicable the channels 80, can extend according to directions that are inclined in relation to the radial direction R, with these directions furthermore able to be orthogonal to the axis 28 or inclined in relation to the latter, i.e. oriented radially inwards in the downstream or upstream direction.

Generally, the through-holes 70, and where applicable the channels 80, are preferably evenly distributed around the axis 28, for reasons of balancing in rotation of the inner ring 40, and where applicable, of the rotor shaft 30.

Moreover, the oil injection device 50 preferably comprises two nozzles arranged outside the rotor 30 (FIG. 2), namely a first nozzle 50A oriented in the direction of the rolling elements 46, and a second nozzle 50B oriented in the direction of respective radially external ends 70A of the through-holes 70 arranged in the radially external surface 40A of the inner ring 40 (FIG. 2A).

The second nozzle 50B thus makes it possible to directly supply with oil the through-holes 70, while the first nozzle 50A directly supplies with oil the rolling elements 46. In other words, an oil spray from the second nozzle 50B in particular reaches the respective radially external ends 70A of the through-holes 70 without encountering any obstacle.

Alternatively, the through-holes 70 can be supplied with the oil flowing on the rolling elements 46, in which case the oil injection device 50 can comprise only the nozzle 50A oriented in the direction of the rolling elements 46.

Further alternatively, the oil injection device 50 can comprise a single nozzle that diffuses a spray that is wide enough to impact at the same time the rolling elements 46 and the through-holes 70.

In the embodiment shown in FIG. 2, the oil injection device 50 is entirely located outside the rotor shaft 30.

Figure 3:
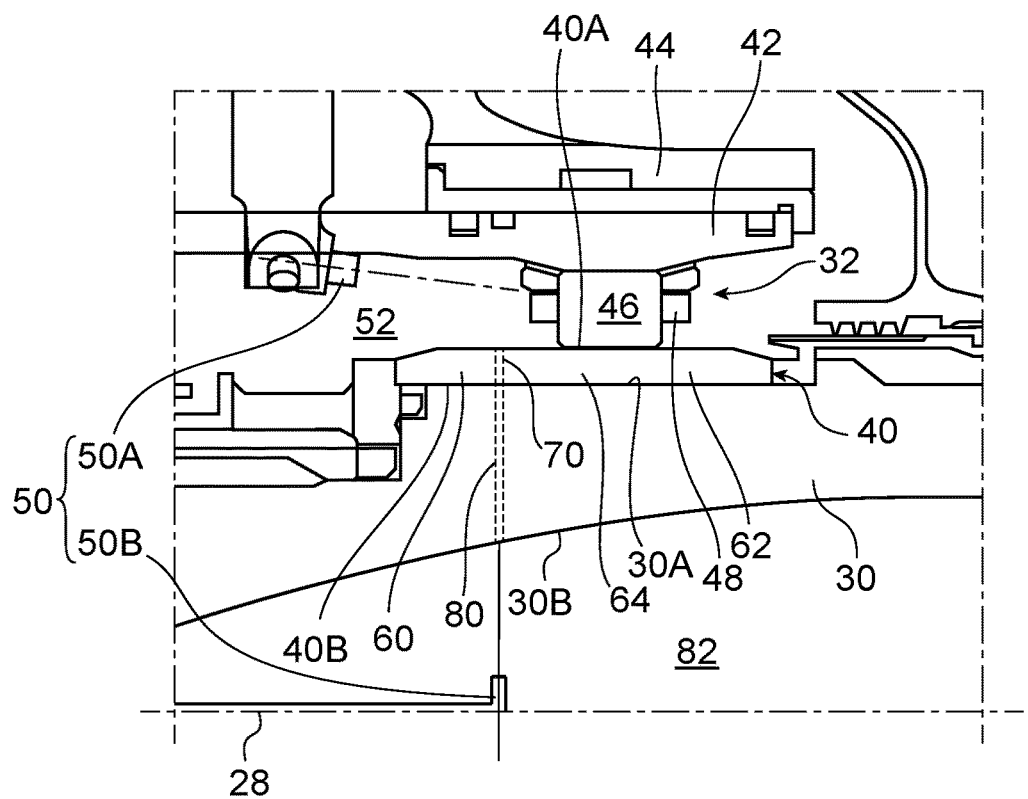
FIGS. 3, 4 and 5 are views similar to FIG. 2, respectively showing alternative embodiments.
Figure 4:
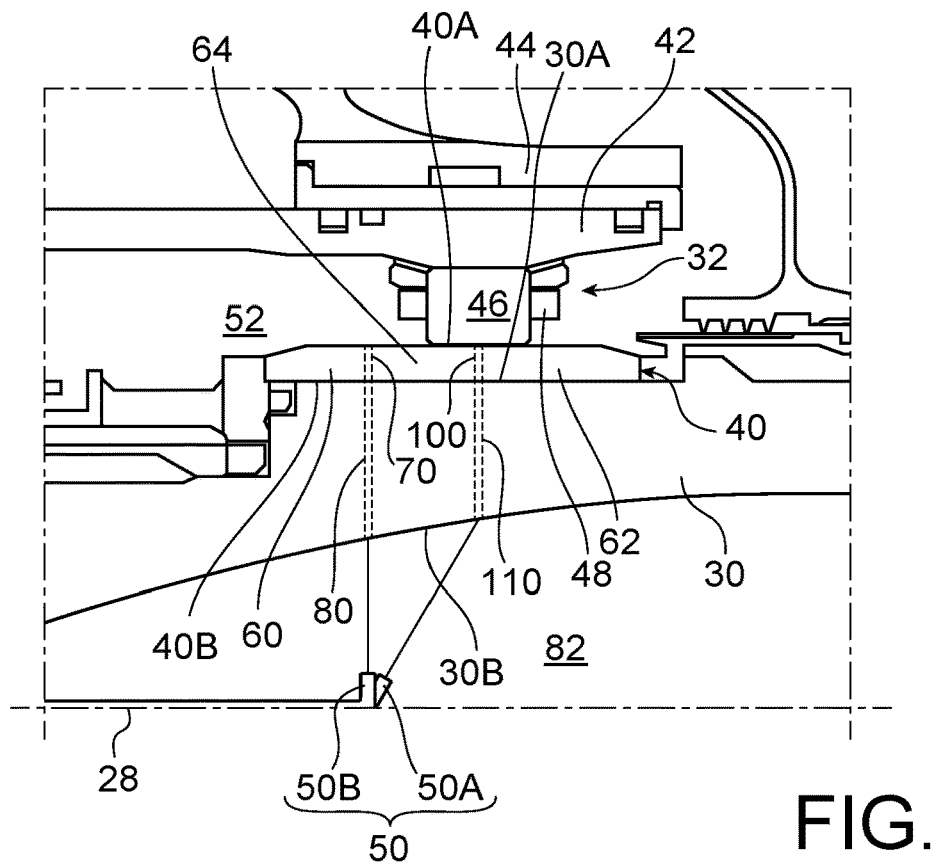
Figure 5:
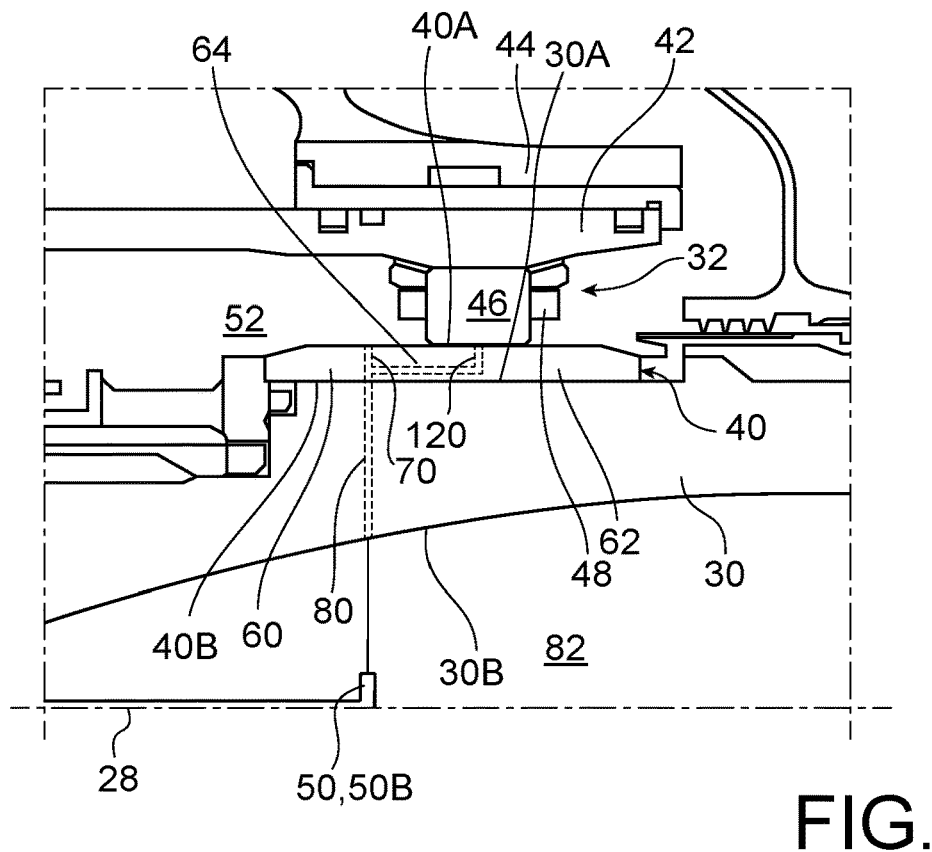

FIGS. 3 to 5 respectively show other embodiments, wherein at least part of the oil injection device 50 is arranged inside the rotor shaft 30.

Thus, in the embodiment of FIG. 3, the oil injection device 50 comprises a first nozzle 50A arranged radially outside the rotor shaft 30 and oriented in the direction of the rolling elements 46, and a second nozzle 50B arranged radially inside the rotor shaft 30 and oriented in the direction of the respective radially internal ends 80B (FIG. 2A) of the channels 80 of the rotor shaft 30 (i.e. the ends arranged in the radially internal surface 30B of the rotor shaft).

In this case, oil coming from the second nozzle 50B (FIG. 3) circulates from the cavity 82, radially outwards through channels 80 and through-holes 70, until penetrating into the oil enclosure 52 via the respective radially external ends 70A (FIG. 2A) of the through-holes, while the first nozzle 50A directly supplies with oil the rolling elements 46 (FIG. 3). It is to be noted that an oil spray from the second nozzle 50B reaches the respective radially internal ends 80B of the channels 80 of the rotor shaft 30 without encountering any obstacle.

Figure 4A:
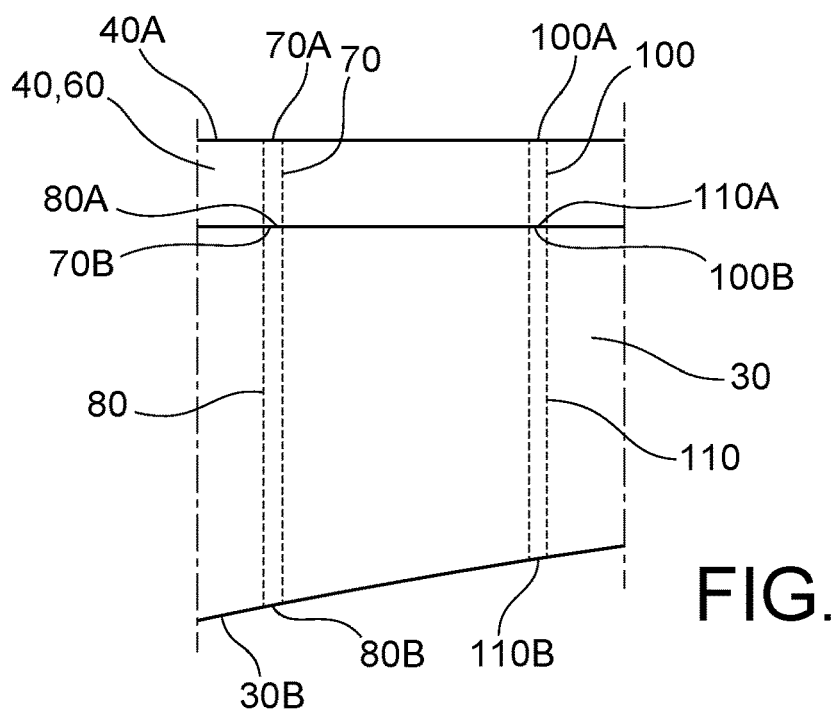
FIGS. 4A and 5A are views on a larger scale, respectively, of portions of FIGS. 4 and 5.

In the embodiment of FIGS. 4 and 4A, the inner ring 40 further comprises other through-holes 100 that connect the radially external surface 40A of the inner ring to the radially internal surface 40B of the inner ring and opening radially facing the rolling elements 46. In addition, the rotor shaft 30 further comprises other channels 110 that connect the radially external surface 30A of the rotor shaft 30 to the radially internal surface 30B of the rotor shaft in such a way that the other channels 110 respectively extend the other through-holes 100.

It must be understood by this that a respective radially internal end 100B (arranged in the radially internal surface 40B of the inner ring) of each other through-hole 100 opens into a respective radially external end 110A (arranged in the radially external surface 30A of the rotor shaft) of another corresponding channel 110, and that the other channels 110 have respective radially internal ends 110B (arranged in the radially internal surface 30B of the rotor shaft) opening into the inner cavity 82 of the rotor shaft 30 (FIG. 4A).

The oil injection device 50 comprises two nozzles arranged inside the rotor shaft 30, namely a first nozzle 50A oriented in the direction of the respective radially internal ends 110B of the other channels 110 of the rotor shaft (arranged in the radially internal surface 30B of the rotor shaft), and a second nozzle 50B oriented in the direction of the respective radially internal ends 80B of the channels 80 of the rotor shaft 30 (arranged in the radially internal surface 30B of the rotor shaft).

In this case, oil coming from the second nozzle 50B circulates from the cavity 82, radially outwards through channels 80 and through-holes 70, until penetrating into the oil enclosure 52 via the respective radially external ends 70A of the through-holes, while the oil coming from the first nozzle 50A circulates from the cavity 82, radially outwards through the other channels 110 and other through-holes 100 (FIG. 4), until penetrating into the oil enclosure 52 via the respective radially external ends 100A of the other through-holes, on rolling elements 46 (FIG. 4A). Again, an oil spray from the second nozzle 50B thereby reaches the respective radially internal ends 80B of the channels 80 of the rotor shaft 30 without encountering any obstacle.

Figure 5A:
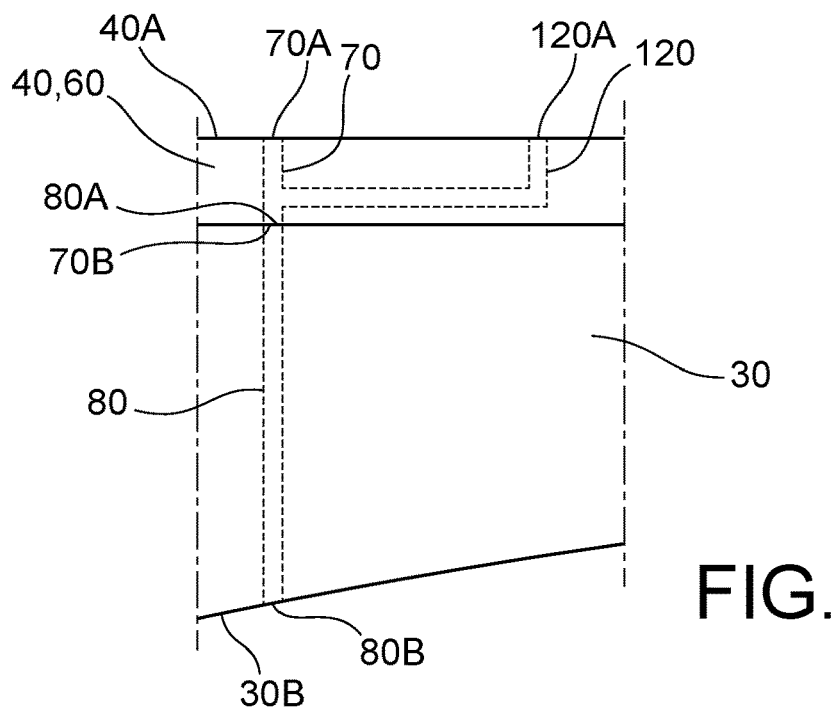

In the embodiment of FIGS. 5 and 5A, the inner ring 40 comprises passages 120 that open into the radially external surface 40A of the inner ring via radially external ends 120A located radially facing rolling elements 46, with these passages 120 being connected to the through-holes 70 or to the channels 80. Such a connection can be obtained with a bent or curved form of the passages 120 (as in the example of FIG. 5).

The oil injection device 50 comprises a nozzle 50B arranged inside the rotor shaft 30 and oriented in the direction of respective radially internal ends 80B of the channels 80 of the rotor shaft (arranged in the radially internal surface 30B of the rotor shaft).

In this case, oil coming from the nozzle 50B circulates from the cavity 82, radially outwards through channels 80 and through-holes 70, in such a way that a portion of the oil penetrates into the oil enclosure 52 via the respective radially external ends 70A of the through-holes, and that another portion of the oil penetrates into the passages 120 and thus reaches the rolling elements 46 via the radially external ends 120A of the passages. An oil spray from the nozzle 50B thereby reaches the respective radially internal ends 80B of the channels 80 of the rotor shaft 30 without encountering any obstacle.

The invention can of course be applied to other types of turbine engines, for example single-spool and/or single-flow, to turbine engines with non-cowled propellers commonly referred to as "open-rotor", and to turbine engines wherein the fan is connected to the low-pressure shaft by the intermediary of a reduction gear.

The invention claimed is:

1. A turbine engine, comprising:
a rotor shaft;
at least one roller bearing supporting the rotor shaft in rotation along an axis, the at least one roller bearing comprising:
an inner ring connected to the rotor shaft,
an outer ring connected to an annular support belonging to a stator of the turbine engine, and
rolling elements engaged between the inner ring and the outer ring,
the inner ring having two axial end annular portions arranged axially on either side of the rolling elements, a first of the two axial end annular portions being exposed more to the heat during operation than a second of the two axial end annular portions, and
an oil injection device configured to supply the rolling elements with oil in such a way as to ensure the lubrication of the latter,
wherein the inner ring comprises through-holes that extend from a radially external surface of the inner ring to a radially internal surface of the inner ring at a location to one side of where the rolling elements engage the radially internal surface, the through-holes being formed in the first axial end annular portion and distributed around the axis in order to allow for a circulation of oil coming from the oil injection device through the first axial end annular portion, and the through-holes being configured for the circulation of oil therethrough to provide more cooling to the first end annular portion in comparison with the second end annular portion, and
wherein the radially internal surface of the inner ring is in surface contact with a radially external surface of the rotor shaft at least on the first axial end annular portion, and the rotor shaft comprises channels that connect the radially external surface of the rotor shaft to a radially internal surface of the rotor shaft in such a way that the channels respectively extend the through-holes.

2. The turbine engine according to claim 1, wherein the second axial end annular portion is devoid of through holes.

3. The turbine engine according to claim 1, wherein the through-holes extend radially.

4. The turbine engine according to claim 1, wherein the channels extend radially.

5. The turbine engine according to claim 1, wherein the oil injection device comprises:
a first nozzle oriented in the direction of the rolling elements and
a second nozzle oriented in the direction of respective radially external ends of the through-holes arranged in the radially external surface of the inner ring, the first nozzle and the second nozzle being arranged outside the rotor shaft.

6. The turbine engine according to claim 5, configured such that an oil spray from the second nozzle reaches the respective radially external ends of the through-holes without encountering any obstacle.

7. The turbine engine according to claim 1, wherein the oil injection device comprises:
a first nozzle arranged outside the rotor shaft and oriented in the direction of the rolling elements, and
a second nozzle arranged inside the rotor shaft and oriented in the direction of respective radially internal ends of the channels of the rotor shaft arranged in the radially internal surface of the rotor shaft.

8. The turbine engine according to claim 7, configured such that an oil spray from the second nozzle reaches the respective radially internal ends of the channels of the rotor shaft without encountering any obstacle.

9. The turbine engine according to claim 1, wherein the inner ring further comprises other through-holes that connect the radially external surface of the inner ring to the radially internal surface of the inner ring and opening radially facing the rolling elements, and
the rotor shaft further comprises other channels that connect the radially external surface of the rotor shaft to the radially internal surface of the rotor shaft in such a way that the other channels respectively extend the other through-holes, and wherein the oil injection device comprises:
- a first nozzle oriented in the direction of respective radially internal ends of the other channels of the rotor shaft arranged in the radially internal surface of the rotor shaft, and
- a second nozzle oriented in the direction of respective radially internal ends of the channels of the rotor shaft arranged in the radially internal surface of the rotor shaft, the first nozzle and the second nozzle being arranged inside the rotor shaft.

10. The turbine engine according to claim 9, configured such that an oil spray from the second nozzle reaches the respective radially internal ends of the channels of the rotor shaft without encountering any obstacle.

11. The turbine engine according to claim 1, wherein the inner ring further comprises passages that open into the radially external surface of the inner ring, facing the rolling elements, and connected to the through-holes or connected to the channels, and wherein the oil injection device comprises a nozzle arranged inside the rotor shaft and oriented in the direction of respective radially internal ends of the channels of the rotor shaft arranged in the radially internal surface of the rotor shaft.

12. The turbine engine according to claim 11, configured such that an oil spray from the nozzle reaches the respective radially internal ends of the channels of the rotor shaft without encountering any obstacle.

13. The turbine engine according to claim 1, further comprising a combustion chamber, and wherein the first axial end annular portion of the inner ring is axially arranged on the side of the combustion chamber.

14. The turbine engine according to claim 13, wherein the combustion chamber is arranged upstream with respect to the at least one roller bearing, and the first axial end annular portion of the inner ring is arranged upstream with respect to the rolling elements.

* * * * *